United States Patent [19]

Thompson

[11] Patent Number: 5,452,274
[45] Date of Patent: Sep. 19, 1995

[54] SOUND-ACTIVATED PLAYBACK DEVICE

[76] Inventor: Barbara J. Thompson, 531 S. Gay St., Ste. 1112, Knoxville, Tenn. 37902

[21] Appl. No.: 257,161

[22] Filed: Jun. 9, 1994

[51] Int. Cl.⁶ .............................................. G11B 15/68
[52] U.S. Cl. ...................................... 369/19; 367/197; 40/455; 381/110; 369/63
[58] Field of Search ....................... 369/19, 20, 63, 64, 369/67; 367/197, 198, 199; 360/5; 381/42, 36, 51, 110

[56] References Cited

U.S. PATENT DOCUMENTS

| | | | |
|---|---|---|---|
| 4,011,586 | 3/1977 | Pastor et al. | 360/61 |
| 4,207,696 | 6/1980 | Hyman et al. | 40/473 |
| 4,317,189 | 2/1982 | Fukuoka | 369/7 |
| 4,322,718 | 3/1982 | Faierstain | 367/197 |
| 4,417,235 | 11/1983 | Del Grande | 367/197 |
| 4,506,378 | 3/1985 | Noso et al. | 367/198 |
| 4,630,248 | 12/1986 | Scott | 367/197 |
| 4,637,007 | 1/1987 | Sakurai | 369/67 |
| 4,640,034 | 2/1987 | Zisholtz | 40/455 |
| 4,973,286 | 11/1990 | Davison | 446/175 |
| 5,012,223 | 4/1991 | Griebell et al. | 367/197 |
| 5,209,695 | 5/1993 | Rothschild | 367/197 |
| 5,218,640 | 6/1993 | Morio et al. | 381/30 |

Primary Examiner—Scott J. Sugarman
Assistant Examiner—Tan Dinh
Attorney, Agent, or Firm—Pitts & Brittian

[57] ABSTRACT

A sound-activated playback device which generally includes a sound-activated circuit and an electrically driven playback device which plays a recording on a selected prerecorded medium. The sound-activated circuit includes a noise sensor for sensing the sound of a crying child and activating the playback device. The sound-activated circuit also includes a timer for selecting and limiting the duration of playback of the recording, a timer override switch for overriding the timer, and a prerecorded medium reset for resetting the prerecorded medium after the playback device stops playing. Further, the sound-activated circuit includes a means for turning off the noise sensor until the playback device has finished playing and the prerecorded medium is reset.

17 Claims, 4 Drawing Sheets

SOUND-ACTIVATED PLAYBACK DEVICE

TECHNICAL FIELD

This invention relates to the field of sound-activated playback devices which detect sound and thereupon play recorded information on a selected medium.

BACKGROUND ART

Soothing an infant who has been awakened from a sound sleep can be a trying experience. Often the infant's fit becomes more intense when he/she sees his/her mother or father come into the room to check on him/her. Sometimes it may be preferable to soothe the baby without the mother or father coming in contact with the infant. A device which is activated by the sound of a crying child which provides soothing sounds would be desirable.

Several sound-activated devices have been developed for children. These devices are designed to entertain and stimulate a child. Typical of the art are those devices disclosed in U.S. Pat. Nos. 4,207,696 issued to Hyman et al. on Jun. 17, 1980; 4,637,007 issued to Sakurai on Jan. 13, 1987; and 4,973,286 issued to Davison. The devices disclosed in the '696, '007 and '286 patents disclose various devices which are sound-activated. The devices are intended to stimulate and entertain the child. They are not intended to soothe and relax the infant. Further, these devices can be activated by any noise.

The sound-activated rotary device disclosed in U.S. Pat. No. 4,322,718, which issued to Faierstain on Mar. 30, 1982 provides a sound-activated circuit which powers a rotary device like a turntable or record player. The device does not provide a means for overriding the timer such that the playback time is unlimited or variable and determined by the parent as opposed to the device. Further, the sound-activated circuit can be activated by any noise of a sufficient level.

Mechanical lullaby boxes play tunes which are intended to soothe an infant. But the length of the tune is limited, the lullaby box provides only one tune and the length of time the lullaby box can play is limited.

Therefore, it is an object of this invention to provide sound-activated playback device which detects the sound of a child crying.

It is a further object of the present invention to provide a sound-activated playback device which, upon detecting the sound of a child crying, plays a soothing recording.

It is still a further object of the present invention to provide a sound-activated playback device which provides a timer for designating the length of the time the device will play.

It is yet a further object of the present invention to provide a sound-activated playback device provides a means for overriding the timer such that the duration of playback of a recording is not limited by a timer.

DISCLOSURE OF THE INVENTION

Other objects and advantages will be accomplished by the present invention which serves to provide a sound-activated playback device. The sound-activated playback device of the present invention generally includes a sound-activated circuit and an electrically operated playback device which plays a recording on a selected prerecorded medium. The sound-activated circuit includes a noise sensor for detecting the sound of a child crying and activating the playback device. The sound-activated circuit also includes a timer for selecting and limiting the length of time the playback device plays, a timer override switch for overriding the timer, and a prerecorded medium reset for resetting the prerecorded medium after the playback device stops playing. Further, the sound-activated circuit includes a means for turning off the noise sensor until the playback device has finished playing and the prerecorded medium is reset.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

A sound-activated playback device incorporating various features of the present invention is illustrated generally at 10 in the figures. The sound-activated playback device 10 is designed to be activated when a sound is detected. More specifically, the sound-activated playback device is designed to begin playing soothing music or sounds when it detects the sound of a baby crying. Moreover, in the preferred embodiment the sound-activated playback device 10 includes a sound-activated circuit 12 which provides a timer 22 such that the playback device 42 plays for a designated time. The circuit 12 also provides a means for resetting the prerecorded medium to the beginning.

Figure 1:
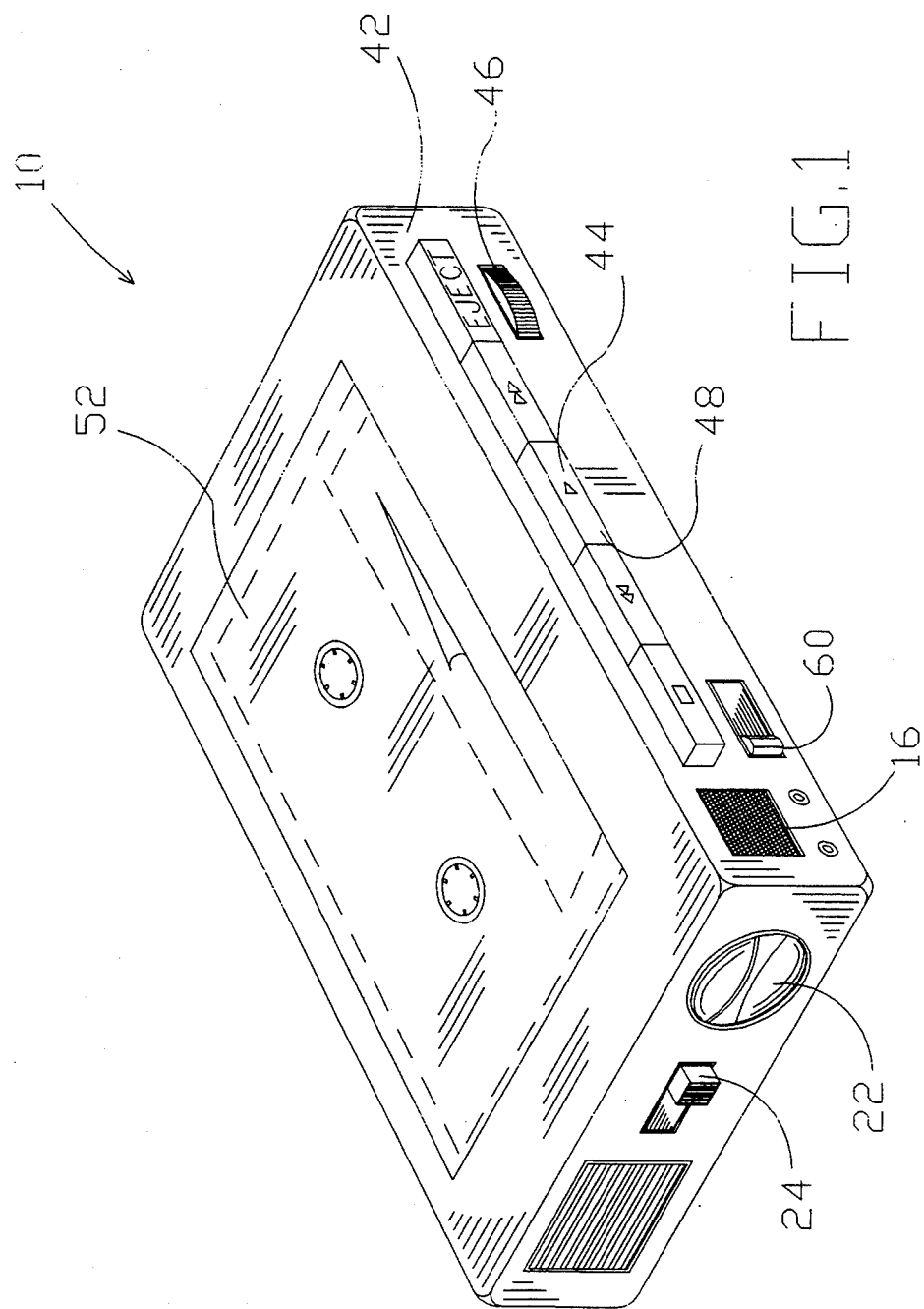
FIG. 1 is a perspective view of the sound-activated playback device constructed in accordance with several features of the present invention.
Figure 2:
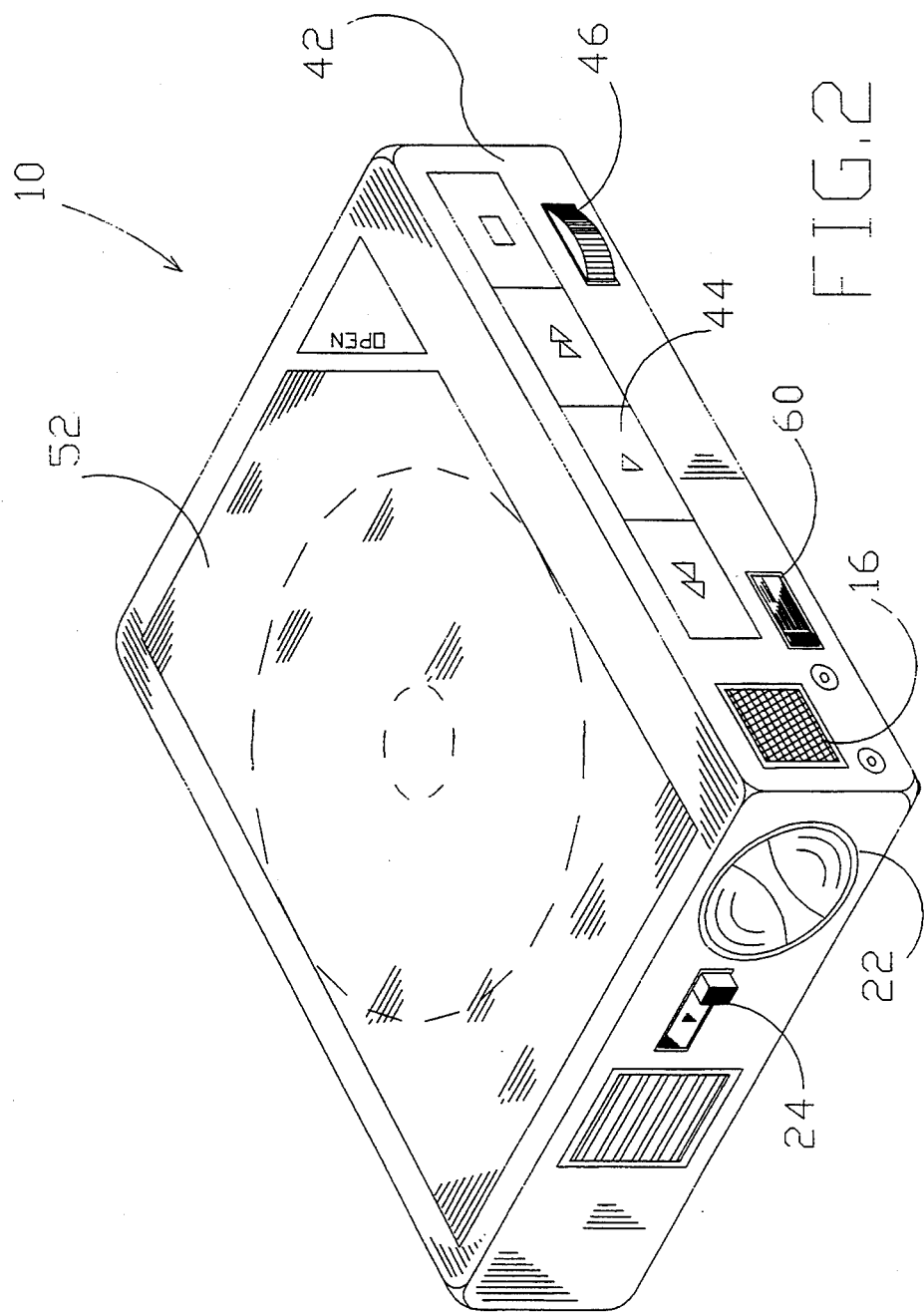
FIG. 2 is a perspective view of an alternate embodiment of the sound-activated playback device of FIG. 1.

As depicted in FIGS. 1 and 2, the sound-activated playback device is generally comprised of a sound-activated circuit 12 and a playback device 42 which is electrically operated. The playback device has a play switch 44 which when activated initiates the playback of a recording on a selected prerecorded medium 52. The sound-activated circuit 12 generally includes a noise sensor 14, a timer 22, a prerecorded medium reset 34 and a noise sensor controller 32. The noise sensor 14 is in electrical communication with the timer 22. The noise sensor 14 detects sound and, after processing and upon acceptance of the level and frequency of the noise, generates an activating signal which is received by the timer 22. The timer 22 designates the duration of time the playback device 42 will play and generates a play signal which directs the play switch 44 of the playback device 42 to initiate the playback of a recording on the selected prerecorded medium 52 within the playback device 42. The noise sensor controller 32 and the prerecorded medium reset 34 are in electrical communication with the play switch 44. The prerecorded medium reset 34 resets the selected prerecorded medium 52 within the playback device 42 after the play switch 44 is deactivated. The noise sensor controller 32 turns off the noise sensor 14 for the duration of time the playback device 42 plays and resets the prerecorded medium 52.

In the preferred embodiment, the sound-activated playback device 10 also includes a mode selector 60. The mode selector 60 is manually controlled and is manipulated to turn the playback device 42 off, to manual control on or to engage the sound-activated circuit 12. In the preferred embodiment, the playback device 42 is a traditional playback device, such a cassette player or compact disc player, which has the sound-activated circuit 12 incorporated therein. More specifically, the playback device 42 also includes at least a volume control 46 and mechanically or electrically manipulated control buttons 48 such that it can be manually controlled as opposed being controlled by the sound-activated circuit 12.

Figure 3:
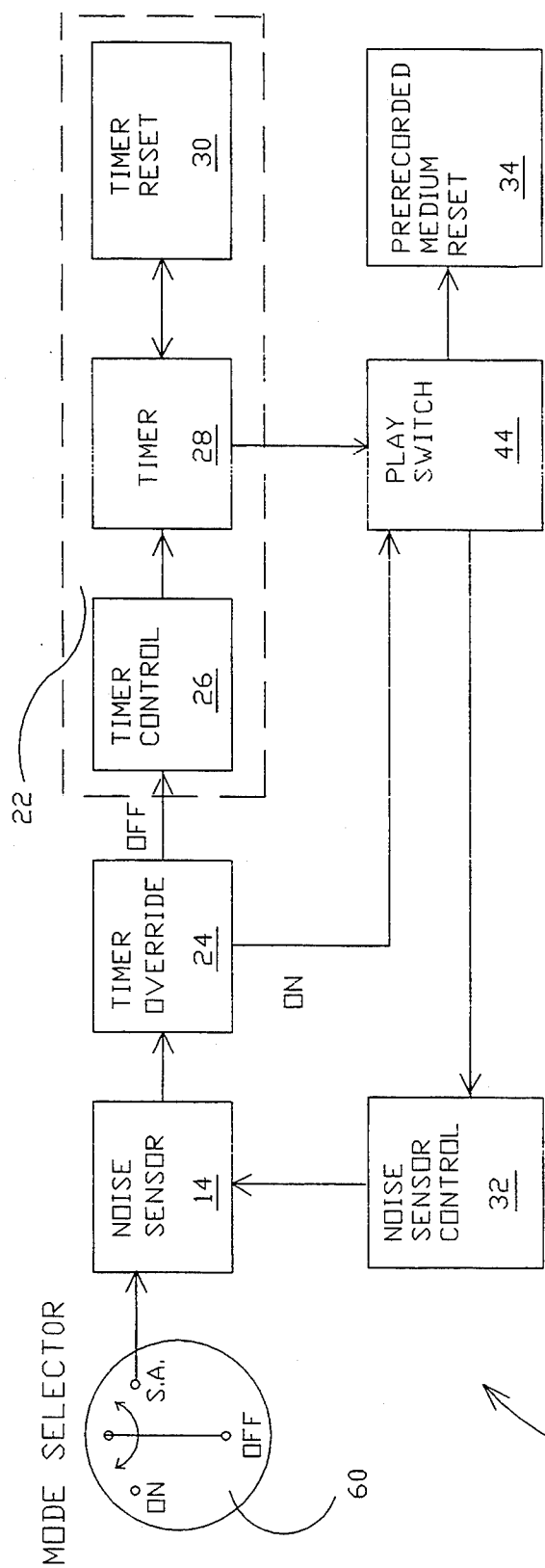
FIG. 3 is a block diagram representing the various circuit elements of the sound-activated circuit of the sound-activated playback device of FIGS. 1 and 2.

A block diagram of the circuit elements of a preferred embodiment of the sound-activated circuit 12 is shown in FIG. 3. As stated, the mode selector 60 is manually controlled. When the mode selector 60 is in the "on" position, the playback device 42 can be manually operated in a typical manner. When the mode selector 60 is set to sound-activated mode, the sound-activated circuit 12 is engaged thereby setting the noise sensor 14 into listening mode. Of course, when the mode selector 60 is set to "off", the device 42 can not be operated.

Figure 4:
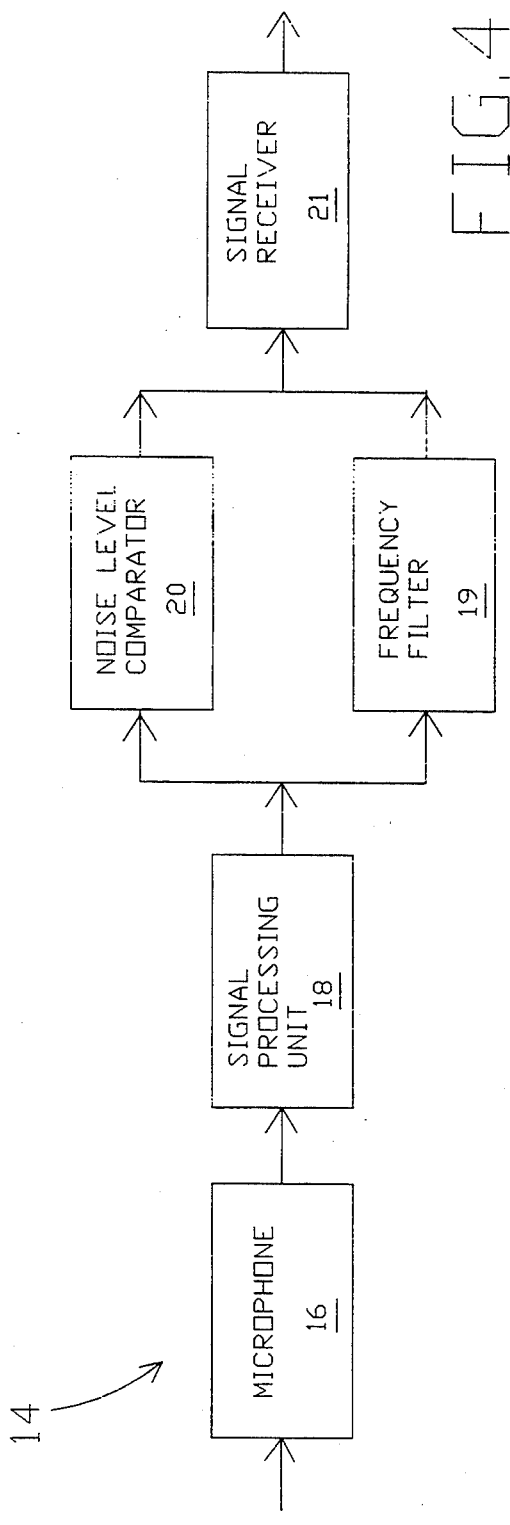
FIG. 4 is a block diagram of the circuit elements of the noise sensor of FIG. 3.

When the sound-activated mode is selected the noise sensor 14 is activated. In the preferred embodiment, the noise sensor 14 includes a microphone 16, a sound processing unit 18, a frequency filter 19, a noise level comparator 20 and a signal receiver 21, as shown in the block diagram of FIG. 4. The microphone 16 detects sound and converts the sound to a signal to be received by the sound processing unit 18 which is in electrical communication with the microphone 16. The sound processing unit 18 processes the signal and sends a processed signal to the frequency filter 19 and the noise level comparator 20, which are in electrical communication with the sound processing unit 18. The frequency filter 19 has a predetermined frequency range. If the frequency of the noise detected is within this range, the frequency filter 19 will send a first enabling signal to the signal receiver 21 which is in electrical communication with the frequency filter 19. The frequency range is the range of frequency of a baby crying.

The noise level comparator 20 has a predetermined level. When the processed signal indicates to the noise level comparator 20 that the microphone 16 detected a sound level above the predetermined level, the noise level comparator 20 will send a second enabling signal to the signal receiver 21 which is in electrical communication with the noise level comparator 20. The comparator 20 is set to prevent low level noises from activating the sound-activated circuit 12.

If the signal receiver 21 receives enabling signals from both the frequency filter 19 and the noise level comparator 20, the signal receiver 21 will generate an activating signal. If frequency of the noise is not within the defined range or the noise is not of a sufficient level, the signal receiver 21 will not generate an activating signal. The activating signal is received by the timer 22 which is in electrical communication with the signal receiver 21. The frequency range is set to the frequency of a child crying such that the playback device is activated by noise of a child crying and not other noises such a dog barking or a television, etc.

Figure 5:
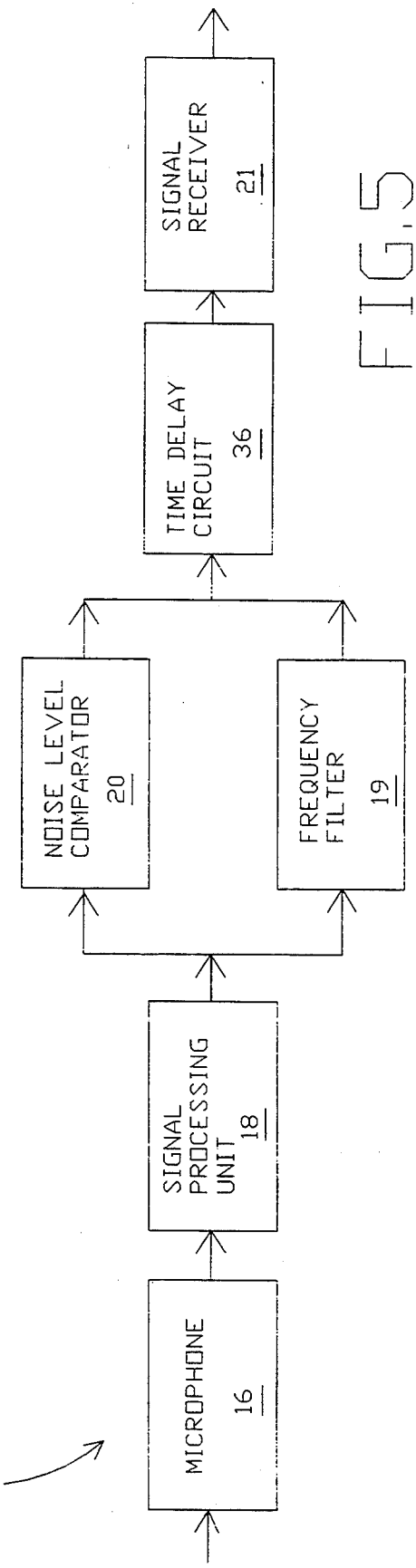
FIG. 5 is a block diagram of the circuit elements of an alternate embodiment of the noise sensor.

Further, in an alternate embodiment, the noise sensor 14 includes a time delay circuit 36 which is electrically connected to the frequency filter 19 and noise level comparator 20 and the signal receiver 21, as shown in FIG. 5. When the time delay circuit 36 receives enabling signals from both the frequency filter 19 and the noise level comparator 20 for a selected extent of time it will subsequently send an enabling signal to the signal receiver 21, which in turn generates an activating signal. Further, the time delay circuit 36 can be mechanically or electronically controlled to designate a selected duration of time.

The timer 22 is generally comprised of a timer control 26, a timer circuit 28 and a timer reset 30. In the preferred embodiment, the timer 22 further includes a timer override 24. The timer override 24 is a manually operated switch. If the timer override 24 is set to "on", a play signal is generated and sent to the play switch 44 of the playback device 42. The play switch 44 is activated such that the playback device 42 begins to play the recording on the prerecorded medium 52. The recording on the prerecorded medium 52 will be played to the end, after which the prerecorded medium reset 34 will be activated to reset the prerecorded medium 52 to the beginning.

If the timer override 24 is set to "off", the timer control 26 will receive the activating signal thereby activating the timer control 26. The timer control 26 can be electronically or mechanically controlled and sets the time that the playback device 42 will play. The timer control 26 activates the timer circuit 28 which generates a play signal which is sent to the play switch 44. The playback device 42 will play the recording of the prerecorded medium 52 for the extent of time designated by the timer control 26. When the timer control 26 is electronically controlled, a timer reset circuit 30 would be employed to electronically reset the timer control 26 to the selected time, after the time has expired. When the timer control 26 is mechanically controlled, the timer control 26 would be reset manually.

The prerecorded medium reset 34 is activated after the play switch 44 is deactivated. The prerecorded medium reset 34 resets the prerecorded medium 52 after the time designated by the timer control 26 has expired or the prerecorded medium 52 has played to the end.

Once the playback device 42 is activated, the noise sensor controller 32 is activated. In the preferred embodiment, the noise sensor controller 32 is a sensor off switch which turns off the microphone such that it is not continually activated by the sound of the playback device 42. In the preferred embodiment, the sensor off switch remains activated until the play switch 44 is deactivated and the prerecorded medium 52 is reset. When the playback device 42 shuts off, the sensor off switch remains activated for a certain amount of time (time delay) due to the capacitive ability of the sensor off switch circuit. As an alternate to the noise level comparator, this time delay can allow the playback device 42 to reset without activating the noise sensor 14. For example, when the playback device 42 is a cassette tape player, the sounds made during rewinding of the tape or switching on or off the control buttons may be loud enough to activate the noise sensor. With the time delay, the device can be reset before returning to a listening mode.

The sound-activated playback device 10 shown in FIG. 1 is a cassette player which includes the sound-activated circuit 12 and the prerecorded medium 52 is a cassette tape. The prerecorded medium reset of the sound-activated circuit for a cassette player is set up to rewind the cassette tape after the cassette has played to the end or after the designated time on the timer has expired.

The sound-activated playback device 10 of FIG. 2 is a compact disc player including the sound-activated circuit 12 and the prerecorded medium 52 is a compact disc. The sound-activated circuit 12 of the present invention can be adapted in accordance with the inherent features of conventional compact disc players. The inherent features being the low operating noise level and a prerecorded medium reset. A time delay in the noise sensor controller would not be necessary due to the low level of noise produced by a conventional compact disc player.

In the preferred embodiment, the sound-activated playback device 10 is packaged with a plurality of prerecorded media 52 having a variety of recordings which are to be played by the playback device 42. For example, a sound-activated cassette tape player would be packaged with a plurality of cassettes, each cassette having different soothing music or sounds recorded on it. Preferably, the playback device would be configured to fit in with the decor of an infant's room, including rounded edges and pastel colors.

Of course, it will be noted that the playback device is not limited to a cassette player or a compact disc player. For example, the playback device can be a laser disc player, a VCR, etc.

From the foregoing description, it will be recognized by those skilled in the art that a sound-activated playback device offering advantages over the prior art has been provided. Specifically, the sound-activated playback device provides a means for sensing sound and activating the playback device to play a recording on a selected prerecorded medium. Further, the sound-activated playback device of the present invention provides a means for controlling the length of time the playback device plays. Moreover, the sound-activated playback device of the present invention provides a means for resetting the prerecorded medium after the playback device is finished playing. Also, a noise sensor controller is provided for turning off the noise sensor means until the playback device has played and reset the prerecorded medium.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A sound-activated playback device for playback of a recording on a selected prerecorded medium, said sound-activated playback device comprising:
   a noise sensor electrically connected to said playback device for detecting sound and generating an activating signal;
   a microphone for receiving sounds and converting said sounds to an electrical signal;
   a sound processing unit in electrical communication with said microphone for receiving and processing said electrical signal, said sound processing unit generating a processed signal;
   a frequency filter in electrical communication with said sound processing unit and receiving said processed signal, said frequency filter generating a first enabling signal when said sounds received by said microphone define a frequency within a predetermined frequency range;
   a noise level comparator in electrical communication with said sound processing unit and receiving said processed signal, said noise level comparator generating a second enabling signal when said sounds received by said microphone define a noise level at least as great as a predetermined noise level; and
   a signal receiver in electrical communication with said frequency filter and said noise level comparator for generating said activating signal when said signal receiver receives said first enabling signal and said second enabling signal;
   a timer in electrical communication with said signal receiver for receiving said activating signal, said timer for controlling a duration of playback of said recording;
   a play switch in electrical communication with said timer for controlling said playback of said recording; and
   a prerecorded medium reset for resetting said prerecorded medium to a starting point of said recording.

2. The sound-activated playback device of claim 1 which further includes a mode selector, said mode selector controlling an ON mode, an OFF mode and a sound-activated mode, said ON mode providing manual control of said playback device, said sound-activated mode for activating said noise sensor.

3. The sound-activated playback device of claim 1 which further includes a noise sensor controller in electrical communication with said play switch and said noise sensor for deactivating said noise sensor at least during said playback of said recording.

4. The sound-activated playback device of claim 1 wherein said noise sensor further includes
   a microphone for receiving sounds and converting said sounds to an electrical signal;
   a sound processing unit in electrical communication with said microphone for receiving and processing said electrical signal, said sound processing unit generating a processed signal;
   a frequency filter in electrical communication with said sound processing unit and receiving said processed signal, said frequency filter generating a first enabling signal when said sounds received by said microphone define a frequency within a predetermined frequency range;
   a noise level comparator in electrical communication with said sound processing unit and receiving said processed signal, said noise level comparator generating a second enabling signal when said sounds received by said microphone define a noise level at least as great as a predetermined noise level; and
   a time delay circuit in electrical communication with said frequency filter and said noise level comparator for generating a third enabling signal when said time delay circuit receives said first enabling signal and said second enabling signal for a selected duration of time; and
   a signal receiver in electrical communication with said time delay for generating said activating signal when said signal receiver receives said third enabling signal.

5. The sound-activated playback device of claim 1 wherein said timer includes a timer control, a timer circuit and a timer reset, said timer control for receiving said activating signal, said timer control setting a selected duration of operation of said timer circuit, said timer control generating a timer signal, said timer circuit in electrical communication with said timer control for receiving said timer signal.

6. The sound-activated playback device of claim 1 further comprising a timer override in electrical communication with said noise sensor, said timer and said play switch for overriding said timer, said timer override receiving said activating signal and sending said activating signal to said timer when said timer override is deactivated, said timer override signalling said play switch when said timer override is activated.

7. A sound-activated playback device for playback of a recording on a selected prerecorded medium, said sound-activated playback device comprising:
  a noise sensor electrically connected to said playback device for detecting sound and generating an activating signal;
  a timer override in electrical communication with said noise sensor for receiving said activating signal;
  a timer in electrical communication with said timer override for receiving said activating signal and controlling a duration of playback of said recording when said timer override is deactivated;
  a play switch in electrical communication with said timer and said timer override, said play switch for controlling said playback of said recording, said play switch being activated by said timer when said timer override is deactivated, said play switch being activated by said timer override when said timer override is activated; and
  a prerecorded medium reset for resetting said prerecorded medium to starting point of said recording.

8. The sound-activated playback device of claim 7 which further includes a mode selector, said mode selector controlling an ON mode, an OFF mode and a sound-activated mode, said ON mode providing manual control of said playback device, said sound-activated mode for activating said noise sensor.

9. The sound-activated playback device of claim 7 which further includes a noise sensor controller in electrical communication with said play switch and said noise sensor for deactivating said noise sensor at least during said playback of said recording.

10. The sound-activated playback device of claim 7 wherein said noise sensor further includes
  a microphone for receiving sounds and converting said sounds to an electrical signal;
  a sound processing unit in electrical communication with said microphone for receiving and processing said electrical signal, said sound processing unit generating a processed signal;
  a frequency filter in electrical communication with said sound processing unit and receiving said processed signal, said frequency filter generating a first enabling signal when said sounds received by said microphone define a frequency within a predetermined frequency range;
  a noise level comparator in electrical communication with said sound processing unit and receiving said processed signal, said noise level comparator generating a second enabling signal when said sounds received by said microphone define a noise level at least as great as a predetermined noise level; and
  a signal receiver in electrical communication with said frequency filter and said noise level comparator for generating said activating signal when said signal receiver receives said first enabling signal and said second enabling signal.

11. The sound-activated playback device of claim 7 wherein said noise sensor further includes
  a microphone for receiving sounds and converting said sounds to an electrical signal;
  a sound processing unit in electrical communication with said microphone for receiving and processing said electrical signal, said sound processing unit generating a processed signal;
  a frequency filter in electrical communication with said sound processing unit and receiving said processed signal, said frequency filter generating a first enabling signal when said sounds received by said microphone define a frequency within a predetermined frequency range;
  a noise level comparator in electrical communication with said sound processing unit and receiving said processed signal, said noise level comparator generating a second enabling signal when said sounds received by said microphone define a noise level at least as great as a predetermined noise level; and
  a time delay circuit in electrical communication with said frequency filter and said noise level comparator for generating a third enabling signal when said time delay circuit receives said first enabling signal and said second enabling signal for a selected duration of time; and
  a signal receiver in electrical communication with said time delay for generating said activating signal when said signal receiver receives said third enabling signal.

12. The sound-activated playback device of claim 7 wherein said timer includes a timer control, a timer circuit and a timer reset, said timer control for receiving said activating signal, said timer control setting a selected duration of operation of said timer circuit, said timer control generating a timer signal, said timer circuit in electrical communication with said timer control for receiving said timer signal.

13. A sound-activated playback device for playback of a recording on a selected prerecorded medium, said sound-activated playback device comprising:
  a noise sensor electrically connected to said playback device for detecting sound and generating an activating signal;
  a microphone for receiving sounds and converting said sounds to an electrical signal;
  a sound processing unit in electrical communication with said microphone for receiving and processing said electrical signal, said sound processing unit generating a processed signal;
  a frequency filter in electrical communication with said sound processing unit and receiving said processed signal, said frequency filter generating a first enabling signal when said sounds received by said microphone define a frequency within a predetermined frequency range;
  a noise level comparator in electrical communication with said sound processing unit and receiving said processed signal, said noise level comparator generating a second enabling signal when said sounds received by said microphone define a noise level at least as great as a predetermined noise level;

a signal receiver in electrical communication with said frequency filter and said noise level comparator for generating an activating signal when said signal receiver receives both said first enabling signal and said second enabling signal;

a timer override in electrical communication with said signal receiver for receiving said activating signal;

a timer in electrical communication with said timer override for controlling a duration of playback of said recording when said timer override is deactivated;

a play switch in electrical communication with said timer and said timer override, said play switch for controlling said playback of said recording, said play switch being activated by said timer when said timer override is deactivated, said play switch being activated by said timer override when said timer override is activated; and a prerecorded medium reset for resetting said prerecorded medium to a starting point of said recording.

14. The sound-activated playback device of claim 13 which further includes a mode selector, said mode selector controlling an ON mode, an OFF mode and a sound-activated mode, said ON mode providing manual control of said playback device, said sound-activated mode for activating said noise sensor.

15. The sound-activated playback device of claim 13 which further includes a noise sensor controller in electrical communication with said play switch and said microphone for deactivating said microphone at least during said playback of said recording.

16. The sound-activated playback device of claim 13 which further includes a time delay circuit in electrical communication with said frequency filter and said noise level comparator for generating a third enabling signal when said time delay circuit receives said first enabling signal and said second enabling signal for a selected duration of time, said signal receiver in electrical communication with said time delay circuit for generating said activating signal when said signal receiver receives said third enabling signal.

17. The sound-activated playback device of claim 13 wherein said timer includes a timer control, a timer circuit and a timer reset, said timer control for receiving said activating signal, said timer control setting a selected duration of operation of said timer circuit, said timer control generating a timer signal, said timer circuit in electrical communication with said timer control for receiving said timer signal.

* * * * *